(12) United States Patent
Bangera et al.

(10) Patent No.: US 9,069,067 B2
(45) Date of Patent: Jun. 30, 2015

(54) CONTROL OF AN ELECTRONIC APPARATUS USING MICRO-IMPULSE RADAR

(75) Inventors: Mahalaxmi Gita Bangera, Renton, WA (US); Roderick A. Hyde, Redmond, WA (US); Muriel Y. Ishikawa, Livermore, CA (US); Edward K. Y. Jung, Bellevue, WA (US); Jordin T. Kare, Seattle, WA (US); Eric C. Leuthardt, St. Louis, MO (US); Nathan P. Myhrvold, Bellevue, WA (US); Elizabeth A. Sweeney, Seattle, WA (US); Clarence T. Tegreene, Bellevue, WA (US); David B. Tuckerman, Lafayette, CA (US); Lowell L. Wood, Jr., Bellevue, WA (US); Victoria Y. H. Wood, Livermore, CA (US)

(73) Assignee: THE INVENTION SCIENCE FUND I, LLC, Bellevue, WA (US)

( * ) Notice: Subject to any disclaimer, the term of this patent is extended or adjusted under 35 U.S.C. 154(b) by 167 days.

(21) Appl. No.: 12/924,036

(22) Filed: Sep. 17, 2010

(65) Prior Publication Data

US 2012/0068876 A1    Mar. 22, 2012

(51) Int. Cl.
*G06Q 30/00* (2012.01)
*G01S 13/02* (2006.01)
*G01S 7/41* (2006.01)
*G01S 13/04* (2006.01)

(Continued)

(52) U.S. Cl.
CPC ............. *G01S 13/0209* (2013.01); *G01S 7/415* (2013.01); *G01S 13/04* (2013.01); *G06F 3/017* (2013.01); *H04N 21/42201* (2013.01); *H04N 21/44218* (2013.01)

(58) Field of Classification Search
CPC ..... A61B 5/0816; A61B 5/165; A61B 5/7253; A61B 5/024; A61B 5/113; G01S 13/52; G01S 13/88; G01S 7/412; G01S 7/415; G06Q 30/02; G06Q 30/0269; G06Q 30/0261
USPC .......... 342/175; 705/14.66, 14.58; 340/545.3, 340/573.1, 573.4; 600/407
See application file for complete search history.

(56) References Cited

U.S. PATENT DOCUMENTS 3,796,208 A    3/1974 Bloice
4,513,748 A    4/1985 Nowogrodzki et al.
(Continued)

FOREIGN PATENT DOCUMENTS

WO    WO 2007/010460 A2    1/2007

OTHER PUBLICATIONS

Michahelles et al.; "Less Contact: Heart-rate detection without even touching the user"; Proceedings of the Eighth International Symposium on Wearable Computers; 2004; vol. 1; pp. 1-4; Retrieved from URL: http://ieeexplore.ieee.org/stamp/stamp.jsp?tp=arnumber=1364682&isnumber=29895 printed on Dec. 26, 2011; IEEE.
PCT International Search Report; International App. No. PCT/ US 11/01629; Jan. 9, 2012; pp. 1-3.
PCT International Search Report; International App. No. PCT/US11/00018; Mar. 4, 2011; pp. 1-2.
(Continued)

*Primary Examiner* — Timothy A Brainard
(74) *Attorney, Agent, or Firm* — Dorsey & Whitney LLP

(57) ABSTRACT

A computer or entertainment system is configured to respond to data received from a micro impulse radar configured to detect movement, physiology, posture, presence, and/or absence of a person in one or more regions near the computer or entertainment system.

62 Claims, 9 Drawing Sheets

(51) Int. Cl.
 *G06F 3/01* (2006.01)
 *H04N 21/422* (2011.01)
 *H04N 21/442* (2011.01)

(56) References Cited

U.S. PATENT DOCUMENTS

| | | | |
|---|---|---|---|
| 4,931,865 A * | 6/1990 | Scarampi | 725/12 |
| 4,958,638 A | 9/1990 | Sharpe et al. | |
| 5,226,425 A | 7/1993 | Righter | |
| 5,305,748 A | 4/1994 | Wilk | |
| 5,361,070 A | 11/1994 | McEwan | |
| 5,448,501 A | 9/1995 | Hablov et al. | |
| 5,507,291 A | 4/1996 | Stirbl et al. | |
| 5,519,400 A | 5/1996 | McEwan | |
| 5,573,012 A | 11/1996 | McEwan | |
| 5,766,208 A | 6/1998 | McEwan | |
| 5,774,091 A | 6/1998 | McEwan | |
| 5,850,470 A | 12/1998 | Kung et al. | |
| 5,905,436 A | 5/1999 | Dwight et al. | |
| 6,011,477 A | 1/2000 | Teodorescu et al. | |
| 6,062,216 A | 5/2000 | Corn | |
| 6,083,172 A | 7/2000 | Baker, Jr. et al. | |
| 6,122,537 A | 9/2000 | Schmidt | |
| 6,211,863 B1 | 4/2001 | Chery et al. | |
| 6,218,979 B1 | 4/2001 | Barnes et al. | |
| 6,289,238 B1 | 9/2001 | Besson et al. | |
| 6,292,688 B1 * | 9/2001 | Patton | 600/544 |
| 6,315,719 B1 | 11/2001 | Rode et al. | |
| 6,351,246 B1 | 2/2002 | McCorkle | |
| 6,454,708 B1 | 9/2002 | Ferguson et al. | |
| 6,466,125 B1 | 10/2002 | Richards et al. | |
| 6,489,893 B1 | 12/2002 | Richards et al. | |
| 6,492,906 B1 | 12/2002 | Richards et al. | |
| 6,524,239 B1 | 2/2003 | Reed et al. | |
| 6,608,910 B1 | 8/2003 | Srinivasa et al. | |
| 6,611,206 B2 | 8/2003 | Eshelman et al. | |
| 6,611,783 B2 | 8/2003 | Kelly, Jr. et al. | |
| 6,656,116 B2 | 12/2003 | Kim et al. | |
| 6,661,345 B1 | 12/2003 | Bevan et al. | |
| 6,696,957 B2 | 2/2004 | Shepher | |
| 6,730,023 B1 | 5/2004 | Dodds | |
| 6,753,780 B2 | 6/2004 | Li | |
| 6,950,022 B2 | 9/2005 | Breed | |
| 6,954,145 B2 | 10/2005 | Nakamura et al. | |
| 7,001,334 B2 | 2/2006 | Reed et al. | |
| 7,106,885 B2 | 9/2006 | Osterweil et al. | |
| 7,196,629 B2 | 3/2007 | Ruoss et al. | |
| 7,272,431 B2 | 9/2007 | McGrath | |
| 7,417,581 B2 | 8/2008 | Fullerton et al. | |
| 7,525,434 B2 | 4/2009 | Batra | |
| 7,567,200 B1 | 7/2009 | Osterweil | |
| 7,692,573 B1 | 4/2010 | Funk | |
| 7,916,066 B1 | 3/2011 | Osterweil | |
| 8,068,051 B1 | 11/2011 | Osterweil | |
| 8,094,009 B2 | 1/2012 | Allen et al. | |
| 8,125,331 B2 | 2/2012 | Allen et al. | |
| 8,130,095 B2 | 3/2012 | Allen et al. | |
| 8,204,786 B2 | 6/2012 | LaBoeuf et al. | |
| 8,284,046 B2 | 10/2012 | Allen et al. | |
| 8,284,990 B2 | 10/2012 | Ma et al. | |
| 8,311,616 B2 | 11/2012 | Feldman et al. | |
| 8,577,446 B2 | 11/2013 | Kyle et al. | |
| 2003/0033449 A1 | 2/2003 | Frantz et al. | |
| 2003/0058372 A1 * | 3/2003 | Williams et al. | 348/836 |
| 2003/0135097 A1 * | 7/2003 | Wiederhold et al. | 600/301 |
| 2004/0027270 A1 | 2/2004 | Fullerton et al. | |
| 2004/0249257 A1 | 12/2004 | Tupin, Jr. et al. | |
| 2004/0249258 A1 | 12/2004 | Tupin, Jr. et al. | |
| 2005/0015286 A1 * | 1/2005 | Rudnik et al. | 705/7 |
| 2005/0040230 A1 | 2/2005 | Swartz et al. | |
| 2005/0046584 A1 | 3/2005 | Breed | |
| 2005/0163302 A1 | 7/2005 | Mock et al. | |
| 2006/0001545 A1 * | 1/2006 | Wolf | 340/573.1 |
| 2006/0061504 A1 | 3/2006 | Leach, Jr. et al. | |
| 2006/0218244 A1 | 9/2006 | Rasmussen et al. | |
| 2006/0224051 A1 | 10/2006 | Teller et al. | |
| 2006/0239471 A1 * | 10/2006 | Mao et al. | 381/92 |
| 2007/0121097 A1 * | 5/2007 | Boillot | 356/28 |
| 2007/0136774 A1 * | 6/2007 | Lourie et al. | 725/105 |
| 2007/0149282 A1 | 6/2007 | Lu et al. | |
| 2007/0214371 A1 | 9/2007 | You et al. | |
| 2008/0007445 A1 | 1/2008 | Leach, Jr. et al. | |
| 2008/0021401 A1 | 1/2008 | Jacobsen et al. | |
| 2008/0028206 A1 | 1/2008 | Sicard et al. | |
| 2008/0065468 A1 | 3/2008 | Berg et al. | |
| 2008/0077015 A1 | 3/2008 | Borick-Lubecke et al. | |
| 2008/0098448 A1 * | 4/2008 | Mondesir et al. | 725/126 |
| 2008/0101329 A1 | 5/2008 | Richards et al. | |
| 2008/0146892 A1 | 6/2008 | LeBoeuf et al. | |
| 2008/0165046 A1 | 7/2008 | Fullerton et al. | |
| 2008/0167535 A1 | 7/2008 | Stivoric et al. | |
| 2008/0183090 A1 | 7/2008 | Farringdon et al. | |
| 2008/0240379 A1 | 10/2008 | Maislos et al. | |
| 2008/0270172 A1 | 10/2008 | Luff et al. | |
| 2008/0270238 A1 | 10/2008 | Zweben et al. | |
| 2009/0017910 A1 * | 1/2009 | Rofougaran et al. | 463/36 |
| 2009/0025024 A1 * | 1/2009 | Beser et al. | 725/12 |
| 2009/0052859 A1 * | 2/2009 | Greenberger et al. | 386/46 |
| 2009/0112697 A1 | 4/2009 | Jung et al. | |
| 2009/0138805 A1 | 5/2009 | Hildreth | |
| 2009/0140851 A1 | 6/2009 | Graves et al. | |
| 2009/0164287 A1 | 6/2009 | Kies et al. | |
| 2009/0284378 A1 | 11/2009 | Ferren et al. | |
| 2009/0296997 A1 * | 12/2009 | Rocheford | 382/124 |
| 2009/0328089 A1 | 12/2009 | Pradeep et al. | |
| 2010/0106475 A1 | 4/2010 | Smith et al. | |
| 2010/0117837 A1 | 5/2010 | Stirling et al. | |
| 2010/0234714 A1 | 9/2010 | Mercier et al. | |
| 2010/0234720 A1 | 9/2010 | Tupin, Jr. et al. | |
| 2010/0241313 A1 | 9/2010 | Fiske et al. | |
| 2010/0259395 A1 | 10/2010 | Nuthi | |
| 2010/0306388 A1 | 12/2010 | Newville | |
| 2011/0080529 A1 * | 4/2011 | Wong | 348/734 |
| 2011/0109545 A1 * | 5/2011 | Touma et al. | 345/158 |
| 2011/0161136 A1 | 6/2011 | Faith et al. | |
| 2011/0307210 A1 | 12/2011 | Stevens et al. | |
| 2012/0116186 A1 * | 5/2012 | Shrivastav et al. | 600/301 |
| 2012/0286955 A1 | 11/2012 | Welch et al. | |
| 2012/0326873 A1 | 12/2012 | Utter, II | |

OTHER PUBLICATIONS

Azevedo et al.; "Micropower Impulse Radar"; Science and Technology Review; Jan./Feb. 1996; Retrieved from the internet on Feb. 10, 2012 (as provided by Officer); pp. 16-29; located at: https://www.llnl.gov/str/pdfs/01_96.2.pdf.

PCT International Search Report; International App. No. PCT US2011/001985; May 2, 2012; pp. 1-5.

Tivive et al.; "A Human Gait Classification Method Based on Radar Doppler Spectrograms"; EURASIP Journal on Advances in Signal Processing; Bearing a date of Feb. 1, 2010; pp. 1-12; vol. 2010; Hindawi Publishing Corporation.

Warren et al.; "Designing Smart Health Care Technology into the Home of the Future"; Sandia National Laboratories; Mar. 25, 1999; pp. 1-18.

Zhang, Zhaonian; "A Micro-Doppler Sonar for Acoustic Surveillance in Sensor Networks"; ProQuest Dissertations and Theses: The Science and Engineering Collection; bearing a date of Aug. 2008; 224 pgs.; ProQuest, LLC.

PCT International Search Report; International App. No. PCT/US2011/001790; Feb. 3, 2012; pp. 1-2.

PCT International Search Report; International App. No. PCT/US 11/01789; Feb. 14, 2012; pp. 1-2.

PCT International Search Report; International App. No. PCT/US 11/00019; Mar. 14, 2011; pp. 1-2.

European Patent Office, Supplementary European Search Report, Pursuant to Rule 62 EPC; App. No. 11834761.6; Apr. 7, 2014; pp. 1-6.

Extended European Search Report; European App. No. EP 11 73 2004; Oct. 7, 2014; pp. 1-6.

* cited by examiner

US 9,069,067 B2

CONTROL OF AN ELECTRONIC APPARATUS USING MICRO-IMPULSE RADAR

SUMMARY

According to an embodiment, a computer with micro-impulse radar (MIR) feedback includes a processing unit including processing hardware and an operating system configured to run one or more application programs. A display under control of the processing unit is configured to display images to a person located in a first region. A MIR is operatively coupled to the processing unit and configured to probe a second region to detect all or a portion of one or more individuals, and produce a corresponding MIR signal. At least one of the processing hardware, operating system, or application program is configured to receive information associated with the MIR signal and determine content or characteristics of the images displayed on the display responsive to one or more characteristics of the MIR information.

According to an embodiment, a computer method includes receiving a sequence of MIR signals corresponding to a person, extracting at least one of a physiological, posture, or movement parameter from the sequence of MIR signals, correlating the physiological, posture, or movement parameter to a predicted emotional state of the person, and conditionally selecting a program execution path responsive to the predicted emotional state of the person.

According to an embodiment, a tangible computer-readable medium carries computer-executable instructions that cause a computer to receive a sequence of MIR signals corresponding to a person, extract at least one of a physiological, posture, or movement parameter from the sequence of MIR signals correlate the physiological, posture, or movement parameter to a predicted emotional state of the person, and conditionally select a program execution path responsive to the predicted emotional state of the person.

According to an embodiment, a method for controlling a computer includes receiving one or more MIR signals from one or more regions; performing analysis on the one or more MIR signals to determine presence, movement, posture, and/or at least one physiological process of each of one or more persons in the one or more regions; and selecting an operation parameter of at least one computer responsive to the presence movement, posture, and/or the physiological process(es) of the one or more persons.

According to an embodiment, a tangible computer-readable medium carries computer-executable instructions that cause a computer to receive one or more MIR signals from one or more regions; perform analysis on the one or more MIR signals to determine presence, movement, posture, and/or at least one physiological process of each of one or more persons in the one or more regions; and responsively select an operation parameter of one or more computers (which may include only the computer executing the instructions).

According to an embodiment, an entertainment system is configured to adapt to personal preferences. The entertainment system includes a media output apparatus, such as a video monitor and/or loudspeakers, configured to present media content according to one or more program options. A MIR is operatively coupled to the media output apparatus and is configured to probe a region proximate the media output apparatus and output a MIR signal. A controller is configured to receive the MIR signal, and select the one or more program options responsive to presence, movement, posture, and/or physiological parameter(s) corresponding to one or more persons in the probed region.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
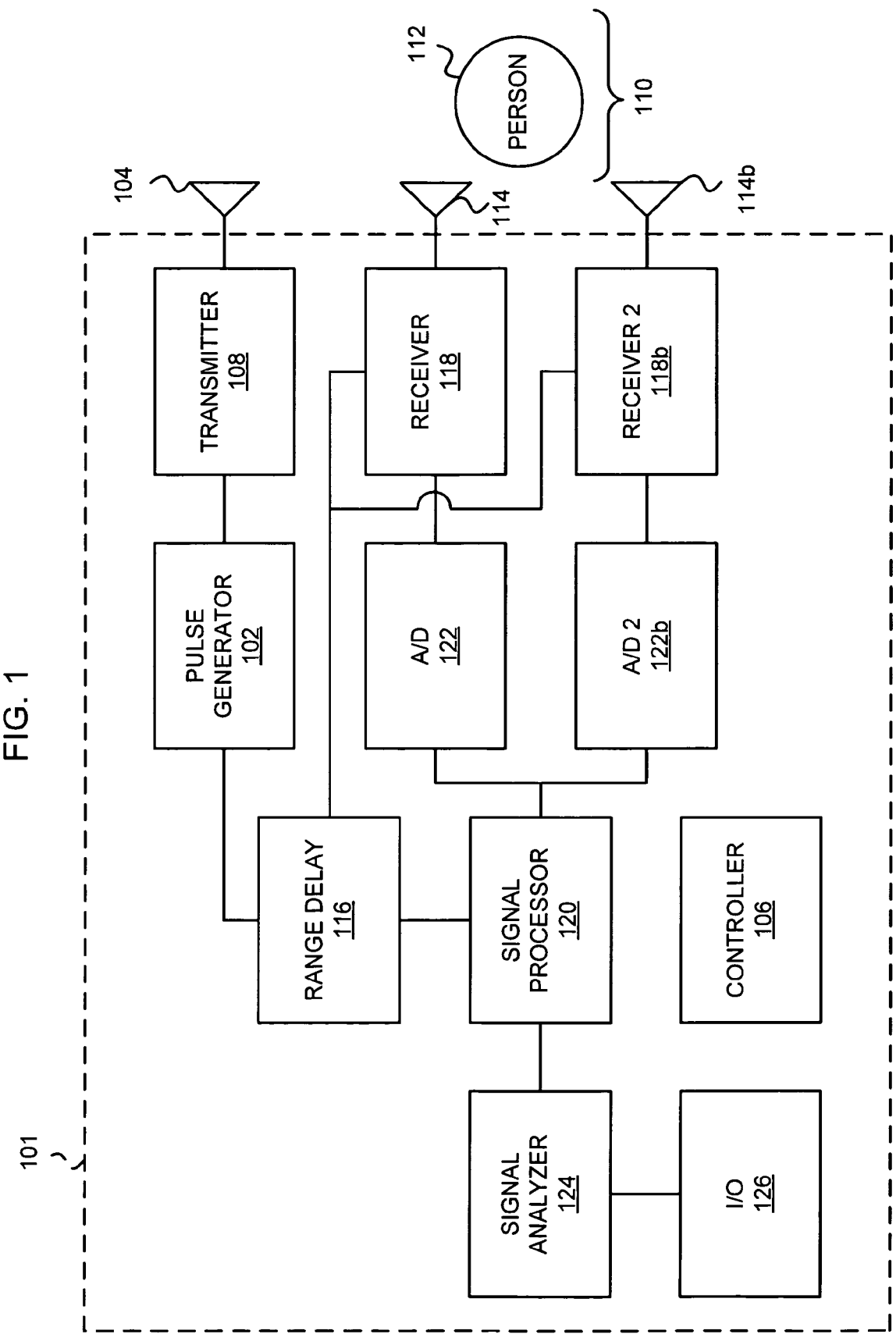
FIG. 1 is a simplified block diagram of a micro-impulse radar (MIR), according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a simplified block diagram of a micro-impulse radar (MIR) 101, according to an embodiment. A pulse generator 102 is configured to output a relatively short voltage pulse that is applied to a transmit antenna 104. A typical transmitted pulse width can be between about two hundred picoseconds and about 5 nanoseconds, for example. The voltage pulse can be conditioned and amplified (or attenuated) for output by a transmitter 108. For example, the transmitter 108 can transmit the voltage pulse or can further condition the pulse, such as by differentiating a leading and/or trailing edge to produce a short sub-nanosecond transmitted pulses. The voltage pulse is typically not modulated onto a carrier frequency. Rather, the voltage pulse transmission spectrum is the frequency domain transform of the emitted pulse. The MIR 101 can probe a region 110 by emitting a series of spaced voltage pulses. For example, the series of voltage pulses can be spaced between about 100 nanoseconds and 100 microseconds apart. Typically, the pulse generator 102 emits the voltage pulses with non-uniform spacing such as random or pseudo-random spacing, although constant spacing can be used if interference or compliance is not a concern. Spacing between the series of voltage pulses can be varied responsive to detection of one or more persons 112 in the region 110. For example, the spacing between pulses can be relatively large when a person 112 is not detected in the region 112. Spacing between pulses can be decreased (responsive to one or more commands from a controller 106) when a person 112 is detected in the region 110. For example, the decreased time between pulses can result in faster MIR data generation for purposes of more quickly determining information about one or more persons 112 in the region 110. The emitted series of voltage pulses can be characterized by spectral components having high penetration that can pass through a range of materials and geometries in the region 110.

An object 112 (such as a person) in the probed region 110 can selectively reflect, refract, absorb, and/or otherwise scatter the emitted pulses. A return signal including a reflected, refracted, absorbed, and/or otherwise scattered signal can be received by a receive antenna 114. Optionally, the receive antenna 114 and transmit antenna 104 can be combined into a single antenna. In a single antenna embodiment, a filter (not shown) can be used to separate the return signal from the emitted pulse.

A probed region 110 can be defined according to an angular extent and distance from the transmit antenna 104 and the receive antenna 114. Distance can be determined by a range delay 116 configured to trigger a receiver 118 operatively coupled to the receive antenna 114. For example, the receiver 118 can include a voltage detector such as a capture-and-hold capacitor or network. The range delay corresponds to distance into the region 110. Range delay can be modulated to capture information corresponding to different distances.

A signal processor 120 can be configured to receive detection signals or data from the receiver 118 and the analog to digital converter 122, and by correlating range delay to the detection signal, extract data corresponding to the probed region 110 including the object 112.

Optionally, the MIR 101 can include a second receive antenna 114b. The second receive antenna can be operatively coupled to a second receiver 118b coupled to an output of the range delay 116 or a separate range delay (not shown) configured to provide a delay selected for a depth into the region 110. The signal processor 120 can further receive output from a second A/D converter 122b operatively coupled to the second receiver 118b.

The signal processor 120 can be configured to compare detection signals received by the antennas 114, 114b. For example, the signal processor 120 can search for common signal characteristics such as similar reflected static signal strength or spectrum, similar (or corresponding) Doppler shift, and/or common periodic motion components, and compare the respective range delays corresponding to detection by the respective antennas 114, 114b. Signals sharing one or more characteristics can be correlated to triangulate to a location of one or more objects 112 in the region 110 relative to known locations of the antennas 114, 114b. The triangulated locations can be output as computed ranges of angle or computed ranges of extent.

For example, a first signal corresponding to a reflected pulse received by an antenna element 114 can be digitized by an analog-to-digital converter (A/D) 122 to form a first digitized waveform. A second signal corresponding to the reflected pulse received by a second antenna element 114b can similarly be digitized by and A/D 122b (or alternatively by the same A/D converter 122) to form a second digitized waveform. The signal processor 120 can compare the first and second digitized waveforms and deduce angular information from the first and second digitized waveforms and known geometry of the first and second antenna elements.

A second pulse can be received at a second range delay 116 value and can be similarly signal processed to produce a second set of angular information that maps a second surface at a different distance. Depth within a given range delay can be inferred from a strength of the reflected signal. A greater number of signals can be combined to provide additional depth information. A series of pulses can be combined to form a time series of signals corresponding to the object 112 that includes movement information of the object 112 through the region 110. The object 112 described herein can include one or more persons.

The signal processor 120 outputs MIR data. The MIR data can include object location information, object shape information, object velocity information, information about inclusion of high density and/or conductive objects such as jewelry, cell phones, glasses including metal, etc., and physiological information related to periodic motion. The MIR data can include spatial information, time-domain motion information, and/or frequency domain information. Optionally, the MIR data can be output in the form of an image. MIR data in the form of an image can include a surface slice made of pixels or a volume made of voxels. Optionally, the image can include vector information.

The MIR data from the signal processor 120 is output to a signal analyzer 124. The signal analyzer 124 can be integrated with the signal processor 120 and/or can be included in the same MIR 101, as shown. Alternatively, the signal processor 120 can output MIR data through an interface to a signal analyzer 124 included in an apparatus separate from the MIR 101.

A signal analyzer 124 can be configured to extract desired information from MIR data received from the signal processor 120. Data corresponding to the extracted information can be saved in a memory for access by a data interface 126 or can be pushed out the data interface 126.

The signal analyzer 124 can be configured to determine the presence of a person 112 in the region 110. For example, MIR data from the signal processor can include data having a static spectrum at a location in the region 110, and a periodic motion spectrum corresponding to the location characteristic of a human physiological process (e.g. heartbeat and/or breathing). From the correspondence of such MIR data, it can be deduced that a person 112 is at the location in the region 110. The signal analyzer 124 can be configured to determine a number of persons 112 in the region 110. The signal analyzer 124 can be configured to determine the size of a person and/or relative size of anatomical features of a person 112 in the region 110. The signal analyzer 124 can be configured to determine the presence of an animal 112 in the region 110. The signal analyzer 124 can be configured to determine movement and/or speed of movement of a person 112 through the region 110. The signal analyzer 124 can be configured to determine or infer the orientation of a person 112 such as the direction a person is facing relative to the region 110. The signal analyzer 124 can be configured to determine one or more physiological aspects of a person 112 in the region 110. The signal analyzer 124 can determine presence of a personal appliance such as a cell phone, PDA, etc. and/or presence of metallized objects such as credit cards, smart cards, access cards, etc. The signal analyzer 124 can infer the gender and age of one or more persons based on returned MIR data. For example, male bodies can generally be characterized by higher mass density than female bodies, and thus can be characterized by somewhat greater reflectivity at a given range. Adult female bodies can exhibit relatively greater harmonic motion ("jiggle") responsive to movements, and can thus be correlated to harmonic spectra characteristics. Older persons generally move differently than younger persons, allowing an age inference based on detected movement in the region 110.

By determination of one or more such aspects and/or combinations of aspects, the signal analyzer 124 can determine a demographic of one or more persons 112 in the region 110.

For example, MIR data can include movement corresponding to the beating heart of one or more persons 112 in the region 110. The signal analyzer 124 can filter the MIR data to remove information not corresponding to a range of heart rates, and determine one or more heart rates by comparing movement of the heart surface to the MIR signal rate. The one or more heart rates can further be characterized according to a confidence factor, depending on statistical certainty regarding the determined one or more heart rates.

Similarly, the signal analyzer 124 can determine one or more respiration rates by measuring movement corresponding to the chest or diaphragm of one or more persons 112. The signal analyzer 124 can determine movement, a direction of movement, and/or a rate of movement of one or more persons 112 in the region 110. Operation of the signal analyzer 124 is described in greater detail below by reference to FIGS. 2 and 3.

An electronic controller 106 can be operatively coupled to the pulse generator 102, the transmitter 108, the range delay 116, the receiver 118, the analog-to-digital converter 122, the signal processor 120, and/or the signal analyzer 124 to control the operation of the components of the MIR 101. For embodiments so equipped, the electronic controller 106 can also be operatively coupled to the second receiver 118*b*, and the second analog-to-digital converter 122*b*. The data interface 126 can include a high speed interface configured to output of data from the signal analyzer 124. Alternatively, for cases where signals are analyzed externally to the MIR, the data interface 126 can include a high speed interface configured to output MIR data from the signal processor 120. The data interface 126 can include an interface to the controller 106. Optionally, the controller 106 can be interfaced to external systems via a separate interface (not shown).

Figure 2:
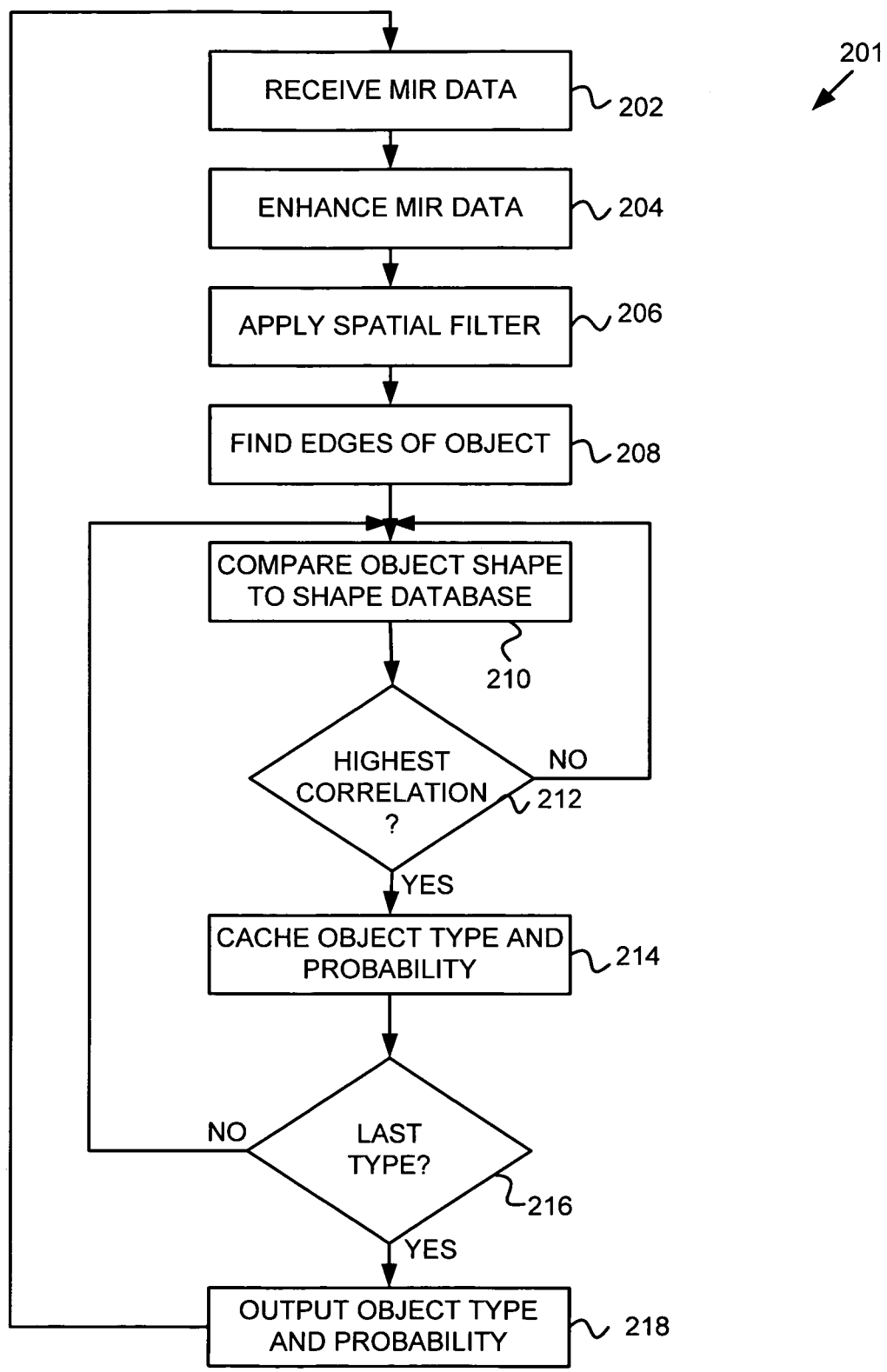
FIG. 2 is a flow chart showing an illustrative process for determining the presence of a person in a region with the MIR of FIG. 1, according to an embodiment.

FIG. 2 is a flow chart showing an illustrative process 201 for determining the presence of one or more persons 112 in the region 110 with the signal analyzer 124 of the MIR 101, according to an embodiment. Beginning with step 202, MIR data is received as described above in conjunction with FIG. 1. The MIR data can correspond to a plurality of probes of the region 110. Proceeding to optional step 204, the MIR data can be enhanced to facilitate processing. For example, grayscale data corresponding to static reflection strength as a function of triangulated position can be adjusted, compressed, quantized, and/or expanded to meet a desired average signal brightness and range. Additionally or alternatively, velocity information corresponding to Doppler shift, and/or frequency transform information corresponding to periodically varying velocity can similarly be adjusted, compressed, quantized, and/or expanded. Systematic, large scale variations in brightness can be balanced, such as to account for side-to-side variations in antenna coupling to the region. Contrast can be enhanced such as to amplify reflectance variations in the region.

Proceeding to optional step 206, a spatial filter can be applied. Application of a spatial filter can reduce processing time and/or capacity requirements for subsequent steps described below. The spatial filter may, for example, include a computed angle or computed extent filter configured to remove information corresponding to areas of contrast, velocity, or frequency component(s) having insufficient physical extent to be large enough to be an object of interest. The spatial filter may, for example, identify portions of the region 110 having sufficient physical extent to correspond to body parts or an entire body of a person 112, and remove features corresponding to smaller objects such as small animals, leaves of plants, or other clutter. According to an embodiment, the spatial filter can remove information corresponding to areas of contrast, velocity, or frequency component(s) having physical extent greater than a maximum angle or extent that is likely to correspond to a person or persons 112. In other embodiments, the spatial filter applied in step 206 can eliminate small, low contrast features, but retain small, high contrast features such as jewelry, since such body ornamentation can be useful in some subsequent processes. The step of applying the spatial filter 206 can further include removing background features from the MIR data. For example, a wall lying between an antenna 104, 114 and the region 110 can cast a shadow such as a line in every MIR signal. Removal of such constant features can reduce subsequent processing requirements.

Proceeding to optional step 208, an edge-finder can identify edges of objects 112 in the region 110. For example, a global threshold, local threshold, second derivative, or other algorithm can identify edge candidates. Object edges can be used, for example, to identify object shapes, and thus relieve subsequent processes from operating on grayscale data. Alternatively, step 208 can be omitted and the process of identifying objects can be performed on the grayscale MIR data.

Proceeding to step 210, processed data corresponding to the MIR data is compared to a database to determine a match. The object data received from step 202 (and optionally steps 204, 206, and/or 208) can be compared to corresponding data for known objects in a shape database. Step 210 can be performed on a grayscale signal, but for simplicity of description it will be assumed that optional step 208 was performed and matching is performed using object edges, velocity, and/or spectrum values. For example, the edge of an object 112 in the region 110 can include a line corresponding to the outline of the head and torso, cardiac spectrum, and movements characteristic of a young adult male. A first shape in the shape database can include the outline of the head and torso, cardiac spectrum, density, and movements characteristic of a young adult female and/or the head and torso outline, cardiac spectrum, density, and movements characteristic of a generic human. The differences between the MIR data and the shape database shape can be measured and characterized to derive a probability value. For example, a least-squares difference can be calculated.

Optionally, the object shape from the MIR data can be stepped across, magnified, and stepped up and down the shape database data to minimize a sum-of-squares difference between the MIR shape and the first shape in the shape database. The minimum difference corresponds to the probability value for the first shape.

Proceeding to step 212, if the probability value for the first shape is the best probability yet encountered, the process proceeds to step 214. For the first shape tested, the first probability value is the best probability yet encountered. If an earlier tested shape had a higher probability to the MIR data, the process loops back from step 212 to step 210 and the fit comparison is repeated for the next shape from the shape database.

In step 214, the object type for the compared shape from the shape database and the best probability value for the compared shape are temporarily stored for future comparison and/or output. For example, the compared shape from the shape database can be identified by metadata that is included in the database or embedded in the comparison data. Proceeding to step 216, the process either loops back to step 210 or proceeds to step 218, depending on whether a test is met. If the most recently compared shape is the last shape available for comparison, then the process proceeds to step 218. Optionally, if the most recently compared shape is the last shape that the process has time to compare (for example, if a new MIR data is received and/or if another process requires output data from the process 201) then the process proceeds to step 218. In step 218, the object type and the probability value is output. The process can then loop back to step 202 and the process 201 can be repeated.

Otherwise, the process 201 loops from step 216 back to step 210. Again, in step 210, the next comparison shape from a shape database is loaded. According to an embodiment, the comparison can proceed from the last tested shape in the shape database. In this way, if the step 218 to 202 loop occurs more rapidly than all objects in the shape database can be compared, the process eventually works its way through the entire shape database. According to an embodiment, the shape database can include multiple copies of the same object at different orientations, distances, and positions within the region. This can be useful to reduce processing associated with stepping the MIR shape across the shape database shape and/or changing magnification.

The object type can include determination of a number of persons 112 in the region 110. For example, the shape database can include outlines, cardiac and/or respiration spectra, density, and movement characteristics for plural numbers of persons. According to embodiments, the shape library can include shapes not corresponding to persons. This can aid in identification of circumstances where no person 212 is in the region 210. Optionally, process 201 can be performed using plural video frames such as averaged video frames or a series of video frames. Optionally, steps 212, 214, and 216 can be replaced by a single decision step that compares the probability to a predetermined value and proceeds to step 218 if the probability meets the predetermined value. This can be useful, for example, in embodiments where simple presence or absence of a person 212 in the region 210 is sufficient information.

According to an embodiment, the signal analysis process 201 of FIG. 2 can be performed using conventional software running on a general-purpose microprocessor. Optionally, the process 201 using various combinations of hardware, firmware, and software and can include use of a digital signal processor.

Figure 3:
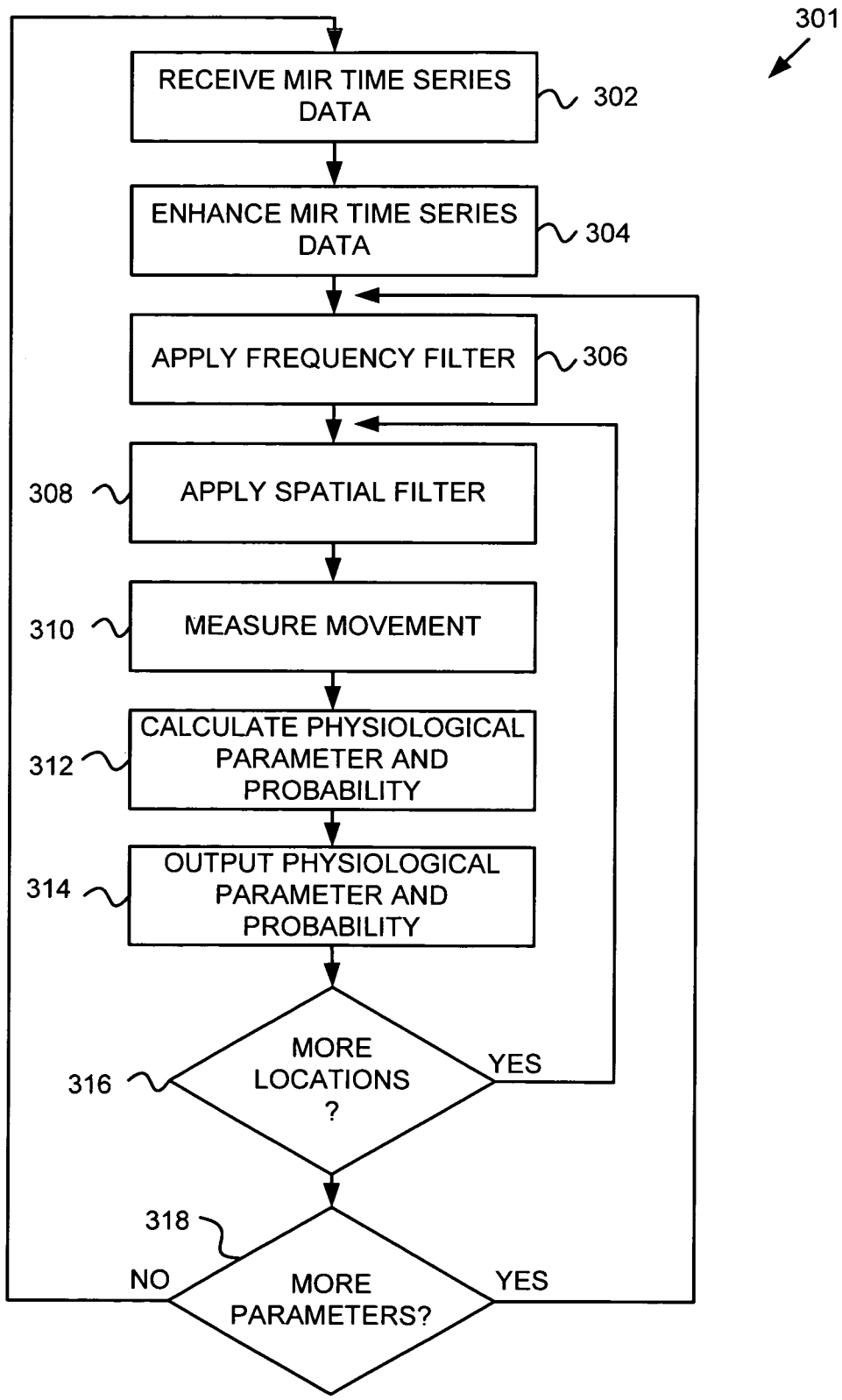
FIG. 3 is a flow chart showing an illustrative process for determining a physiological parameter of a person in a region with the MIR of FIG. 1, according to an embodiment.

FIG. 3 is a flow chart showing an illustrative process 301 for determining one or more particular physiological parameters of a person 112 in the region 110 with the signal analyzer 124 of the MIR 101, according to an embodiment. Optionally, the process 301 of FIG. 3 can be performed conditional to the results of another process such as the process 201 of FIG. 2. For example, if the process 201 determines that no person 112 is in the region 110, then it can be preferable to continue to repeat process 201 rather than execute process 301 in an attempt to extract one or more particular physiological parameters from a person that is not present.

Beginning with step 302, a series of MIR time series data is received. While the received time series data need not be purely sequential, the process 301 generally needs the time series data received in step 302 to have a temporal capture relationship appropriate for extracting time-based information. According to an embodiment, the MIR time series data can have a frame rate between about 16 frames per second and about 120 frames per second. Higher capture rate systems can benefit from depopulating frames, such as by dropping every other frame, to reduce data processing capacity requirements.

Proceeding to step 304, the MIR video frames can be enhanced in a manner akin to that described in conjunction with step 204 of FIG. 2. Optionally, step 304 can include averaging and/or smoothing across multiple MIR time series data. Proceeding to optional step 306, a frequency filter can be applied. The frequency filter can operate by comparing changes between MIR time series data to a reference frequency band for extracting a desired physical parameter. For example, if a desired physiological parameter is a heart rate, then it can be useful to apply a pass band for periodic movements having a frequency between about 20 cycles per minute and about 200 cycles per minute, since periodic motion beyond those limits is unlikely to be related to a human heart rate. Alternatively, step 304 can include a high pass filter that removes periodic motion below a predetermined limit, but retains higher frequency information that can be useful for determining atypical physiological parameters.

Proceeding to optional step 308, a spatial filter can be applied. The spatial filter may, for example, include a pass band filter configured to remove information corresponding to areas of contrast having insufficient physical extent to be large enough to be an object of interest, and remove information corresponding to areas too large to be an object of interest. The spatial filter may, for example, identify portions of the region 110 having sufficient physical extent to correspond to the heart, diaphragm, or chest of a person 112, and remove signal features corresponding to smaller or larger objects. The step of applying the spatial filter 308 can further include removing background features from the MIR data. For example, a wall lying between an antenna 104, 114 (114*b*) and the region 110 can cast a shadow such as a line in every instance of MIR data. Removal of such constant features can reduce subsequent processing requirements.

Proceeding to step 310, movement such as periodic movement in the MIR time series data is measured. For example, when a periodic motion is to be measured, a time-to-frequency domain transform can be performed on selected signal elements. For example, when a non-periodic motion such as translation or rotation is to be measured, a rate of movement of selected signal elements can be determined. Optionally, periodic and/or non-periodic motion can be measured in space vs. time. Arrhythmic movement features can be measured as spread in frequency domain bright points or can be determined as motion vs. time. Optionally, subsets of the selected signal elements can be analyzed for arrhythmic features. Optionally plural subsets of selected signal elements can be cross-correlated for periodic and/or arrhythmic features. Optionally, one or more motion phase relationships between plural subsets of selected signal features, between a subset of a selected signal feature and the signal feature, or between signal features can be determined.

For example, a person with a hiccup can be detected as a non-periodic or arrhythmic motion superimposed over periodic motion of a signal element corresponding to the diaphragm of the person.

Proceeding to step 312, a physiological parameter can be calculated. For example, MIR data can include data having a periodic motion spectrum corresponding to the location characteristic of a human physiological process (e.g. heartbeat and/or breathing). Step 312 can include determining one or more heart rates by comparing movement of the heart surface to the MIR signal rate. The one or more heart rates can further be characterized according to a confidence factor, depending on statistical certainty regarding the determined one or more heart rates. Similarly, step 312 can include determining one or more respiration rates by measuring movement corresponding to the chest or diaphragm of one or more persons.

Proceeding to step 314, the physiological parameter can be output. Proceeding to step 316, if there are more locations to measure, the process 301 can loop back to execute step 308. If there are not more locations to measure, the process can proceed to step 318. In step 318, if there are more physiological parameters to measure, the process 301 can loop back to execute step 306. If there are not more physiological parameters to measure, the process 301 can loop back to step 302, and the process 301 of FIG. 3 can be repeated.

Figure 4:
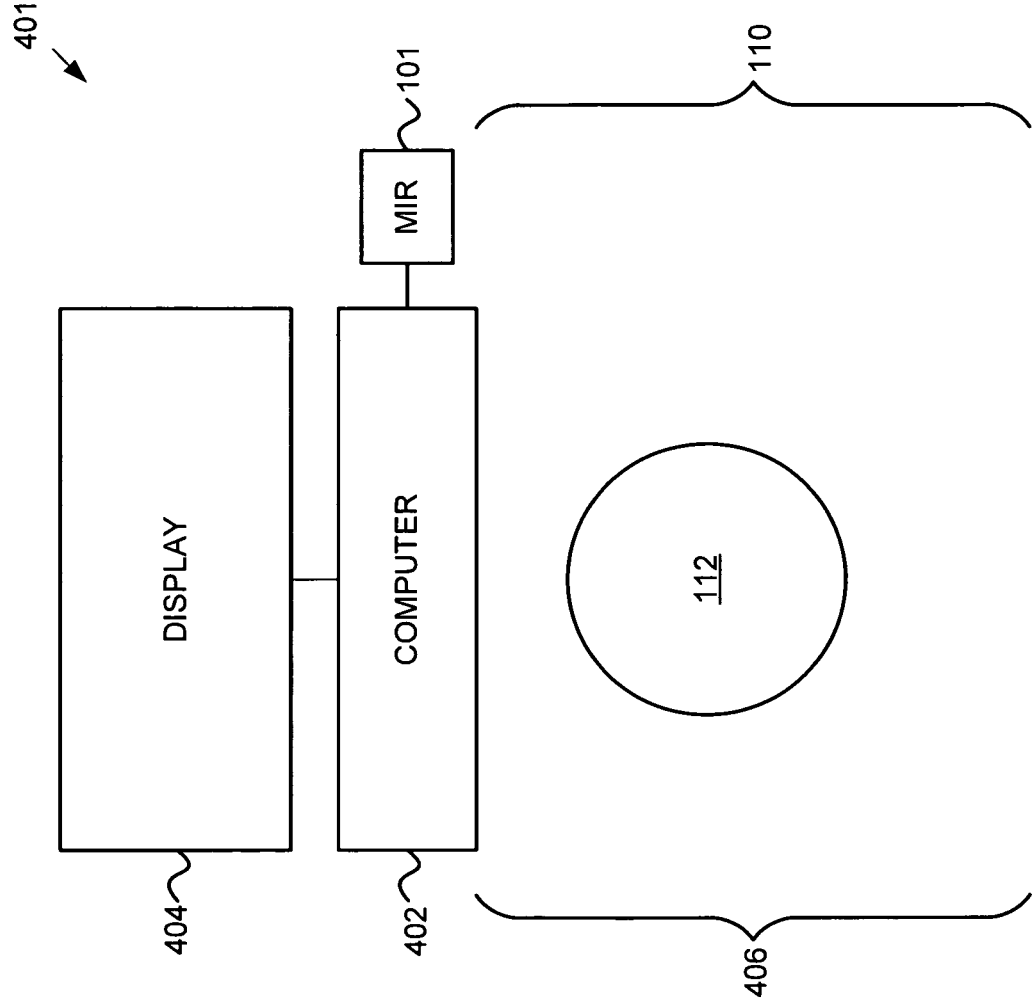
FIG. 4 is a block diagram of a system including a computer with MIR feedback, according to an embodiment.

FIG. 4 is a block diagram of a system 401 including a computer with MIR feedback, according to an embodiment. The computer with micro-impulse radar feedback 401 includes a processing unit 402 including processing hardware and an operating system configured to run one or more application programs. A display 404 is under control of the processing unit 402 and configured to display images to a person 112 located in a first region 406. The first region 406 can be considered the viewing region. A MIR 101 is operatively coupled to the processing unit 402 and configured to probe a second region 110 to detect all or a portion of one or more individuals 112. According to an embodiment, the one or more individuals 112 can include a user of the computer system 401. The user can input commands to run the operating system and/or application programs on the processing unit 402.

As described in FIGS. 1-3, the MIR 101 is configured to produce a MIR signal. Depending on how the MIR 101 and computer processing unit 402 are configured, the MIR signal can be substantially the same as MIR data output by the signal processor 120 described above. Alternatively, at least a portion of the MIR signal processing and/or analysis can be performed by the computer processing unit 402, and the MIR signal can be more primitive than output of MIR analysis. Alternatively, the MIR signal can correspond to a signal output by the signal analyzer 122.

According to approaches described herein, at least one of the processing hardware, operating system, or application program portions of the processing unit 402 is configured to receive information associated with the MIR signal and determine content or characteristics of the images displayed on the display 404 responsive to one or more characteristics of the micro-impulse radar information.

Figure 5:
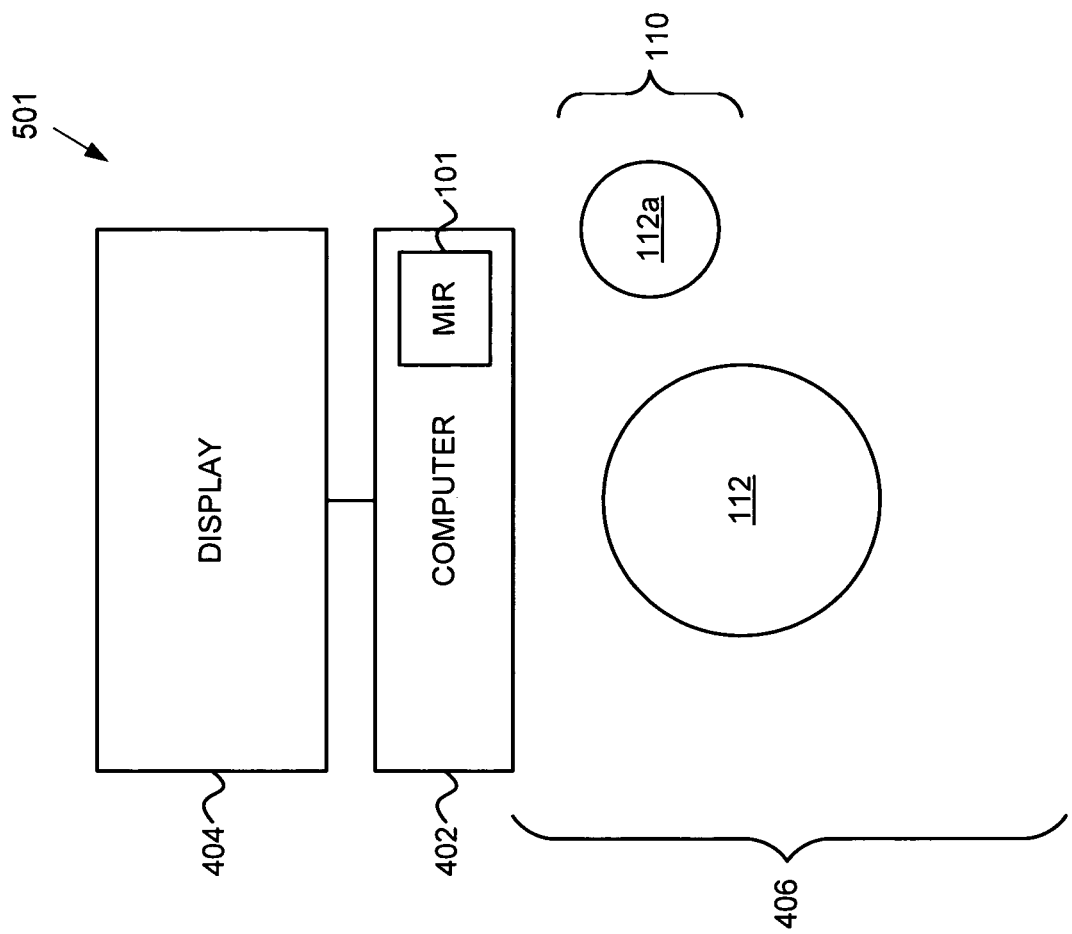
FIG. 5 is a block diagram of a system including a computer with MIR feedback, according to another embodiment.

As indicated in FIG. 4, the first region 406 and second region 110 can be substantially coincident, such as when a majority of the regions 406 and 110 overlap. Referring to FIG. 5, the system 501 can alternatively be configured such that the second region 110 is a portion of the first region 406. For example, the MIR probe region 110 can be configured to measure characteristics of a portion 112a of the person 112. If the portion 112a of the person 112 corresponds to a hand, for example, the MIR 101 can receive signals corresponding to hand gestures such as gestures corresponding to operation of a virtual pointing device, operation of a virtual keyboard, American Sign Language (ASL), or other gesture convention. A person 112 shall be understood to include one or more portions 112a.

Alternatively, the first region 406 can be a portion of the second region 110. The MIR can be configured to probe a second region 110 that is larger than the region 406 from which the display 404 can be viewed. For example, the computer processing unit 402 can be configured to select a parameter and output an image on the display 404 in anticipation of one or more persons 110 entering the viewing region 406. In another alternative, the first and second regions 406, 110 can be substantially non-coincident. For example, the MIR can probe a person 112 traveling through a second region 110, and the computer processing unit 402 can output an image to the display 404 at a time substantially coincident with the person 112 entering the viewing region 406.

Referring again to FIGS. 1-3, the MIR signals can include a MIR image. The MIR signals can correspond to MIR data, such as MIR data output by the signal processor 120.

Referring to FIG. 1, the MIR 101 of FIGS. 4 and 5 can include a transmitter 108 configured to transmit electromagnetic pulses toward the second region 112. A range delay gate 116 can be configured to delay the pulses to trigger at least one receiver 118. Thus, the receiver 118 can be synchronized to the range delay gate 116 and configured to receive electromagnetic energy scattered from the pulses as they encounter objects, such as one or more persons 112, in the region 110. A signal processor 120 can be configured to receive signals or data from the receiver 118 and perform signal processing on the signals or data to extract one or more signals corresponding to at least one of human presence, human movement, human posture, or human physiological processes.

As shown in FIG. 4, the MIR 101 can be configured as a separate device from and operatively coupled to the computer processing unit 402. For example, the MIR 101 can be configured to communicate with the computer process via an exposed interface such as usb, IEEE 802.11x, line level inputs, or other conventional data interface. Alternatively, as indicated in FIG. 5, the MIR 101 can be integrated into the computer processing unit 402. Various levels of integration and partitioning are contemplated. The signal processor 120 can be integrated into the computer processing unit 402. Similarly, the signal processor 120 can be integrated into the MIR 101. This distinction may be moot in cases where the MIR 101 is integrated into the computer processing unit 402.

Figure 6:
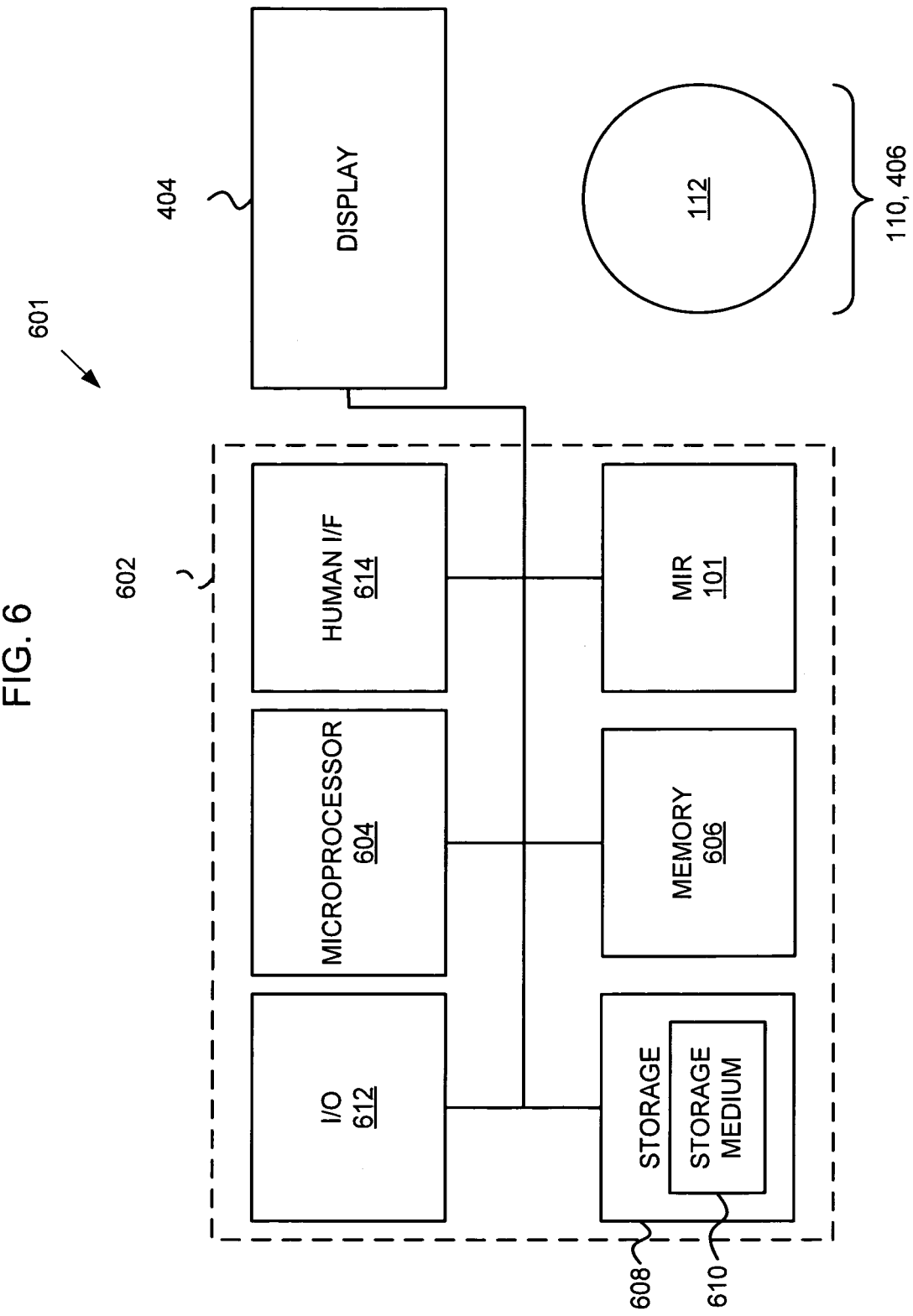
FIG. 6 is a block diagram of a computer architecture having an operatively coupled MIR, according to an embodiment.

Referring to FIG. 6, according to an embodiment, the signal processor 120 can be configured as a portion of the processing hardware. The signal processor 120 can be embodied as software operable to run on the processing unit 402, a relatively low cost solution when the microprocessor (s) 604 has sufficient bandwidth. The signal processor 120 can similarly include both dedicated hardware and computer executable instructions operable to run on the processing hardware.

FIG. 6 is a block diagram of a computer architecture 602 having an operatively coupled MIR 101, according to an embodiment. The computer 602 typically includes a microprocessor 604 operatively coupled to computer memory 606 (which includes tangible computer-readable media capable of carrying computer-readable instructions), computer storage 608 including a storage medium 610 that forms a tangible computer-readable medium capable of carrying computer-readable instructions, a data interface 612, and one or more human interfaces 614. For example, the human interface can include a keyboard, a computer pointing device such as a mouse, a touch screen, and/or a microphone. As indicated above, the MIR 101 can operate as a human interface and can augment or replace one or more conventional human interface apparatuses 614. The computer 602 can include or be operatively coupled to a display 404 and/or one or more additional output apparatuses (not shown) configured to output program output and/or media to one or more persons 112. The display 404 and/or one or more additional output apparatuses (not shown) are configured to output information, entertainment, etc. to the one or more persons 112 in a first region 406. The MIR 101 is configured to probe a second region 110 and responsively output an MIR signal or MIR data corresponding to presence, movement, posture, and/or physiological processes of one or more persons 112 in a region 406. As described in conjunction with FIGS. 4 and 5, the regions 110 and 406 can be substantially coincident, overlapping, disjointed, and/or one region can be a subset of the other region.

The MIR can be embedded in a computer motherboard. Optionally, the MIR 101 can be configured as an expansion card such as a card compliant with ISA, PCI, PCI Express, NuBus, or other standard. Optionally, the MIR can be physically separate from and operatively coupled to the computer 602, such as through an exposed interface (not shown). Optionally, the MIR 101 can include an integrated signal processor, which can include Fourier transformation hardware or software. Optionally, signal processing can be performed using software running on the hardware 602 represented in FIG. 6. The MIR 101 and/or the computer 602 can include a signal analyzer configured to receive signals or data from the signal processor and to perform signal analysis to determine, from the one or more extracted signals, variable data corresponding to human presence, human movement, human posture, and/or the human physiological processes. The computer 602 can control media content and/or program execution responsive to the received variable data corresponding to human presence, human movement, human posture, and/or the human physiological processes.

The MIR 101 can include an interface operatively coupled to a signal analyzer and configured to output MIR data including variable data corresponding to human 112 presence, human movement, human posture, and/or human physiological processes to the processing unit 602. A signal processor can be configured to output MIR data corresponding to human 112 presence, human movement, human posture, and/or human physiological processes to one or more memory circuit 606 or storage device 608, 610 locations.

An operating system running on the computer 602 can be configured to read at least a subset of the MIR data at the one or more memory circuit 606 or storage device 608, 610 locations and responsively adjust one or more operating system parameters. Responsive adjustment of one or more operating system parameters may, for example, include waking the operating system from a sleep mode responsive to MIR data corresponding to human presence in the second region 110. Similarly, adjustment of one or more operating system parameters can include entering a sleep mode responsive to MIR data corresponding to departure of an individual 112 from the second region 110.

Additionally or alternatively, an application running on the computer 602 can be configured to read at least a subset of the MIR data at the one or more memory circuit 606 or storage device 608, 610 locations and responsively adjust one or more application parameters.

For example, adjustment one or more operating system parameters or application parameters can include selection of terse prompts or fast response responsive to MIR data corresponding to human 112 movement, posture, or physiological processes characteristic of impatience or urgency. Additionally or alternatively, adjustment of one or more operating system or application parameters can include conversion of the MIR data into cursor movements. For example, adjustment of one or more application or operating system parameters can includes conversion of the MIR data into computer pointer device 614 commands.

As indicated above, an application program running on the computer 602 can be configured to read at least a subset of the MIR data at the one or more memory circuit 606 or storage device 608, 610 locations and responsively adjust application program parameters. For example, an application program can be configured to convert the MIR data to program commands. Alternatively or additionally, the application program can be configured to convert the MIR data to one or more preferences selections. For example, one or more preferences selections can include automated help, terse response, verbose response, and/or video magnification.

As indicated above, information associated with the MIR signal can correspond to a human 112 physiological process. Such a physiological process can include heartbeat, tremor, perspiration, and/or breathing, for example. An application program and/or operating system can further be configured to correlate the physiological process, movement, and/or posture to a predicted emotional state of an individual 112. The operating system and/or application program can be configured to conditionally select a program execution path as a function of the predicted emotional state.

Figure 7:
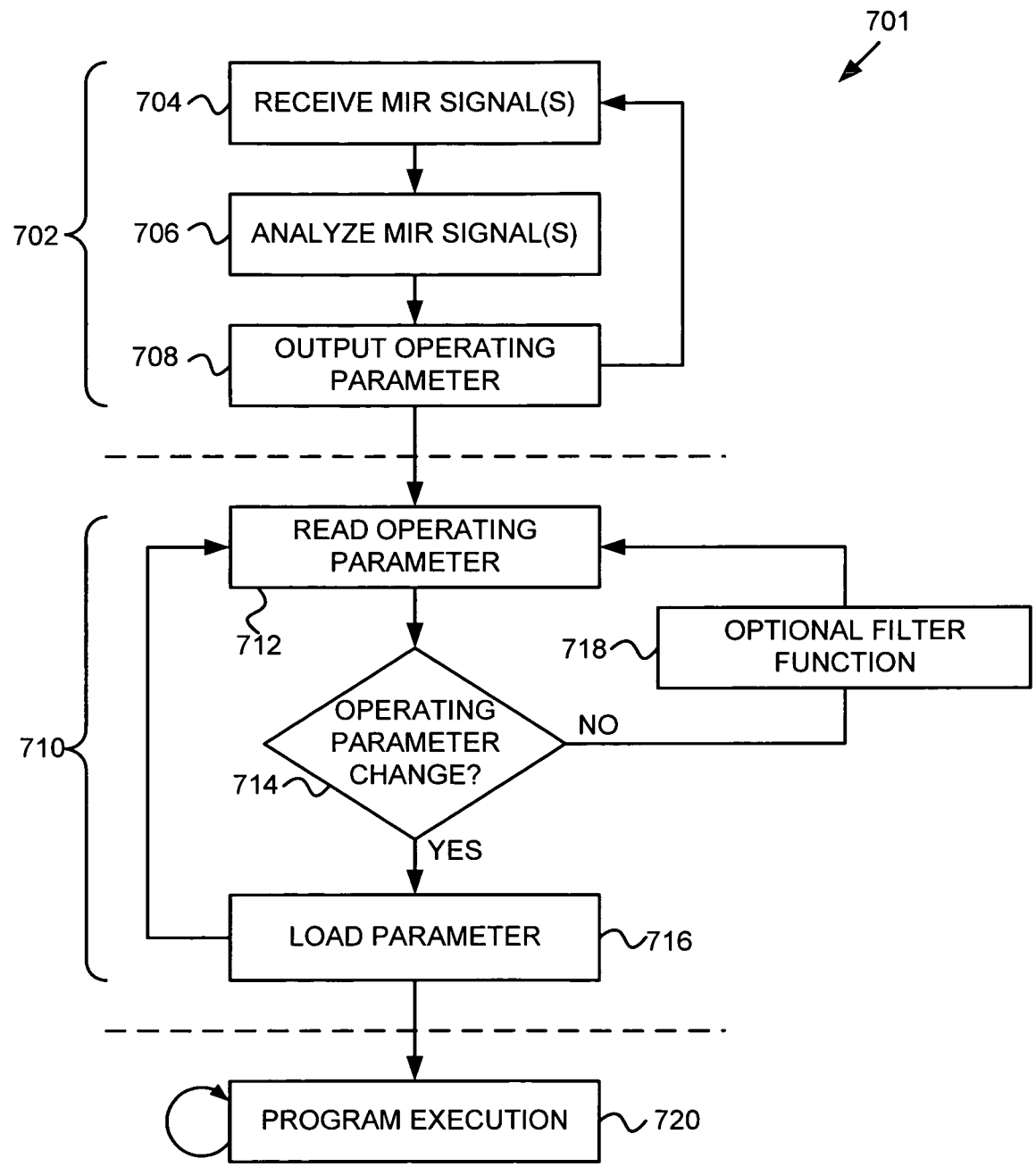
FIG. 7 is a flow chart illustrating a method for controlling a computer using parameters determined by a MIR, according to an embodiment.

FIG. 7 is a flow chart illustrating a method 701 for controlling a computer using parameters determined by a MIR, according to an embodiment. A first section 702 of the method 701 corresponds to generation of an operating parameter for controlling an operating system and/or application program. Section 702 can be performed by hardware, by an application program, and/or by an operating system, for example.

Beginning at step 704, one or more MIR signals is received from one or more regions (e.g., one or more regions 110). For example, the MIR signals can include a MIR image. According to an embodiment, the MIR signals can correspond to MIR data.

Proceeding to step 706, analysis is performed on the one or more MIR signals to determine presence, movement, posture, and/or one or more physiological processes of one or more persons in the one or more regions. For example, the one or more persons can include a user of the computer. Approaches to determining presence, movement, posture, and/or physiological processes of persons are described above in conjunction with FIGS. 1-3, for example. For example, physiological processes can include heartbeat, perspiration, tremor, and/or breathing, and corresponding physiological parameters can include heart rate, moistness of the skin, a periodic movement or shaking, or breathing rate.

Proceeding to step 708, an operating parameter, which can include one or more operating parameters, is selected and output for at least one computer responsive to the presence, movement, posture, and/or one or more physiological processes of the one or more persons in the one or more regions.

For example, a physiological parameter can be indicative of a physiological state of the person and determine an operating parameter for the computer. Determining an operating parameter can include correlating at least one physiological parameter to a predicted emotional state. For example, correlating the at least one physiological parameter to the predicted emotional state can include correlating the physiological parameter to an autonomic nervous system state and correlating the autonomic nervous system state to the predicted emotional state.

Similarly, a posture can be indicative of a physiological state and/or an intent. For example, a person lying prone may be unconscious, asleep, or relaxed. A person who is hunched or collapsed on the ground may be injured, sick, or emotional. A stance may be threatening or precarious. A movement may indicate good balance or a lack of balance. Another movement and/or tremor may correspond to laughing, coughing, or sneezing. A detected movement stability, periodicity, and/or tremor may indicate decreased motor control, shaking, trembling, or undergoing a seizure. Such a posture or movement may be conscious or may be unconscious. Embodiments herein include driving an electronic apparatus responsive to these and other indications of a command, a condition, or an intent that may be extracted from or included in MIR data.

A data value corresponding to the operating parameter can be written to computer memory or a storage device. Alternatively, line levels can be set at pins of a microprocessor or other hardware, a combination of one or more line levels being set according to the analyzed MIR signals. A number of parameters and/or line levels can be selected to correspond to the sophistication of control desired. For example, simple presence or absence of a person in a region can be communicated to the computer by setting a bit or a single line level.

A larger number of bits or lines, or a greater number of variables can be set to correspond to control the computer with greater sophistication. For example, an X-Y location or velocity of a digit of a hand (representing a computer pointer, e.g. mouse, position) can be represented to high precision by two bytes for each axis. A vertical position or velocity of the digit (representing a pointer device selection, e.g. mouse click) can be represented by as little as a single bit if software filtering is not desired. Similarly, operating parameters can be determined or output corresponding to one or more of other presence data such as a probability of presence of a person, movement such as body movements and/or velocity intended to control a computer game, posture (such as lying prone, adopting an aggressive stance, or being hunched over, and/or physiological parameters such as parameters corresponding to tremor, perspiration, heart rate, and/or breathing depth and rate.

After outputting one or more operating parameters, the process section 702 loops back to step 704 and is repeated. The frequency of looping can be determined according to an operating state. For example, if the system is in a sleep mode and is intended to wake up when a person enters a region, looping can be relatively slow, such as once per second. On the other hand, if the computer is in active operation with movements used to control a cursor, then looping can be relatively rapid, such as once per millisecond to once per 100 milliseconds, depending on desired responsiveness, bandwidth, and/or preferred limits on MIR probe radiation.

Section 710 of the process 701 can be performed asynchronously from process 702. For example, section 710 can be performed by a device driver, API, or other operating system-related process. Starting with step 712, the operating parameter is read. Proceeding to step 714, the new operating parameter can be compared to previous values of the operating parameter or a function of previous values of the operating parameter, if the operating parameter has not changed (e.g. in a statistically significant way), the process can loop back through an optional process 718 and then to step 712. The optional process 718 may, for example, perform filtering such as debounce or other noise reduction. The process 718 can be programmable, with its functionality determined by context. In this way, the test performed in step 714 can be required to be performed a plurality of times prior to the condition being determined true. If step 714 is determined to be true, the process proceeds to step 716, where the parameter is loaded. For example, loading the parameter can include writing a value (either the value of the operating parameter or a corresponding data value) into a memory or storage location that can be accessed by other processes, or can include setting one or more line levels on pins of a microprocessor or other hardware.

For example, selecting an operation parameter and/or subsequent performance of section 710 of process 701 can include waking portions of the computer when the one or more persons enters the one or more regions. According to an embodiment, prior to waking the portions of the computer, performing analysis on a sequence of micro-impulse radar signals can determine a probability that the one or more persons has an intent to use the computer. Determining the probability that the one or more persons has an intent to use the computer can include analyzing movements of the one or more persons. For example, the one or more persons can be determined to have a high probability of intent to use the computer when the one or more persons enter a computer operating position. For example, one or more persons can be determined to have a high probability of intent to use the computer when the one or more persons approach near to or reach for a computer keyboard or a computer pointing device and/or approach the computer display.

Similarly, selecting an operation parameter and/or subsequent performance of section 710 of process 701 can including placing one or more portions of the computer in a sleep mode when the one or more persons leaves the one or more regions. According to an embodiment, prior to putting portions of the computer to sleep, performing analysis on a sequence of MIR signals can determine a probability that the one or more persons has an intent to stop using the computer.

When a parameter or parameters are loaded in step 716, the parameter or parameters can be read by an operating system and/or one or more application programs. Proceeding to step 720, which can be performed asynchronously from section 710 of the process 701, program execution can be performed responsive to the loaded parameter or parameters.

According to another embodiment, selecting an operation parameter includes conditionally selecting computer program logic. For example, sections 702 and 710 can include analyzing movements and/or posture of the one or more persons. Loading the parameter(s) in step 716 can amount to entering one or more software commands responsive to the movements and/or posture.

Referring to step 720, the one or more software commands can include commands to operate game software on the computer. For example, the one or more software commands can be selected to drive virtual movements of one or more game entities corresponding to the movements of the one or more persons.

The method described in conjunction with FIG. 7 can be physically embodied as computer executable instructions carried by a tangible computer readable medium. According to embodiments, the method shown in FIG. 7 can be used in apparatuses other than general purpose computers, such as video gaming systems, entertainment systems, and/or other systems that benefit from MIR input to electronic processing functions.

Figure 8:
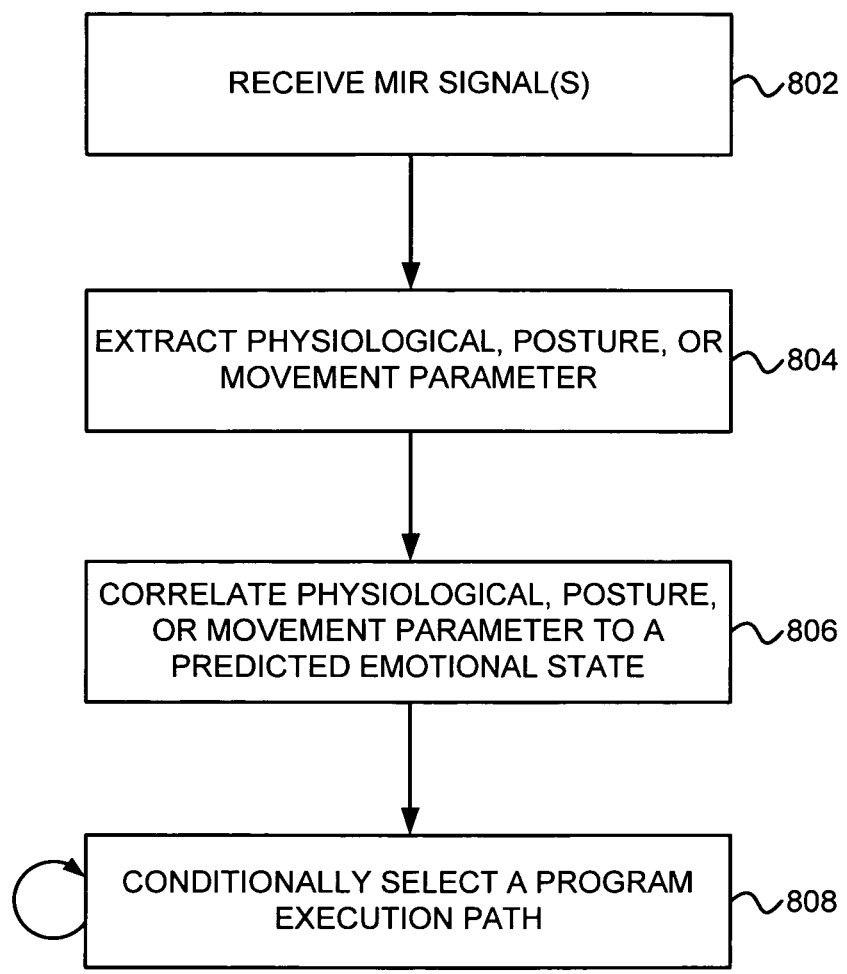
FIG. 8 is a flow chart illustrating a method for operating a computer responsive to an emotional state of a person, according to an embodiment.

FIG. 8 is a flow chart illustrating a method 801 for operating a computer responsive to an emotional state of a person, according to an embodiment. The person can be a user of the computer.

Beginning with step 802, a sequence of MIR signals is received, the signals including characteristics corresponding to a person. The MIR signals can include micro-impulse radar image. The MIR signals can correspond to micro-impulse radar data, such as MIR data produced by a signal analyzer, as described in conjunction with FIGS. 1-3.

Proceeding to step 804, at least one parameter corresponding to at least one of a physiology, posture, or movement of the person is extracted from the sequence of MIR signals. For example, a physiological parameter can include at least one of heartbeat, perspiration on the skin of the person, tremor, or respiration. The physiological parameter (optionally along with posture and/or movement) can determine the physiological state of the person.

Proceeding to step 806 the at least one parameter extracted in step 804 is correlated to a predicted emotional state of the person. For example, correlating a physiological, posture, or movement parameter to the predicted emotional state can include correlating the physiological parameter to an autonomic nervous system state. Step 804 can include labeling the predicted emotional state a positive or negative.

Proceeding to step 808 a program execution path is conditionally selected responsive to the predicted emotional state of the person. Conditionally selecting a program execution path can include conditionally selecting a program execution path predicted to please the person.

Conditionally selecting a program execution path can include to activating a program function correlated to a positive emotional state. Alternatively, conditionally selecting a program execution path can include disabling a program function correlated to a negative emotional state. For example, disabling a program function correlated to a negative emotional state can include disabling an automatic format function correlated to a negative emotional state.

Referring to step 804, if the person is confused or otherwise uncertain of how to perform a function or what function to perform, he or she can display movement, posture, and/or physiological signs such as tensing muscles of the face, cocking his or her head to one side, consulting printed materials near the computer, or otherwise betraying a state of puzzlement, such as can be observable by another person, and which corresponds to detectable information that is extracted from the MIR signals. Accordingly, in step 806, the physiological, posture, or movement parameter can be correlated to a prediction of puzzlement.

In step 808, conditionally selecting a program execution path can include activating a help function responsive to the predicted puzzlement. For example, activating a help function can include activating verbose prompts. Verbose prompts can thus provide additional help to aid the user in overcoming his or her puzzlement.

Referring again to step 804, if a person is impatient, then he or she can tap a finger, fidget, exhibit increased heart rate and/or a staccato breathing motion, and so the extracted physiological, posture, or movement parameter extracted from the MIR signal may, in step 806, be correlated to a prediction of impatience. Accordingly, conditionally selecting a program execution path can include selecting a path intended to reduce the impatience of the person. For example, terse prompts can be activated responsive to predicting impatience, the terse prompts thus reducing processing and/or interface time, and providing the person less reason for being impatient.

According to some embodiments, it can be desirable for an application to produce a target emotional state in a person, such as in a computer game. For example, the program execution path selected in step 808 can include selecting game logic responsive to the predicted emotional state. According to an embodiment, the game logic can be selected to provide predicted emotional states including tension and release. Conditionally selecting a program execution path in step 808 responsive to the predicted emotional state of the person can include selecting a game difficulty level responsive to the predicted emotional state.

According to embodiments, various movement, posture, and/or physiological parameters can indicate different inputs and be used to drive system response in different ways, or in ways that are an interaction product of two or more movement, posture, and/or physiological parameters. For example, an explicit movement of a finger can be used to determine an explicit intent to make a command gesture, while smaller, involuntary movements such as a tremor in the finger can be used to infer a physiological and/or emotional state. Similarly, posture can indicate a transitory mood, a disposition, and/or an intent of a person. For example, a person taking an aggressive stance can indicate an aggressive mood or, in another context, can drive an aggression parameter in a computer game. A prone posture can indicate relaxation, or in another context, can drive a "play dead" parameter in a computer game. A hunched over posture can indicate physical or emotional distress. As may be appreciated, interpretation of MIR information can be made context-sensitive, can be disabled, and/or can be used to construct a user profile for future reference.

The method described in conjunction with FIG. 8 can be physically embodied as computer executable instructions carried by a tangible computer readable medium. According to embodiments, the method shown in FIG. 8 can be used in apparatuses other than general purpose computers, such as video gaming systems, entertainment systems, and/or other systems that benefit from MIR input to electronic processing functions.

Figure 9:
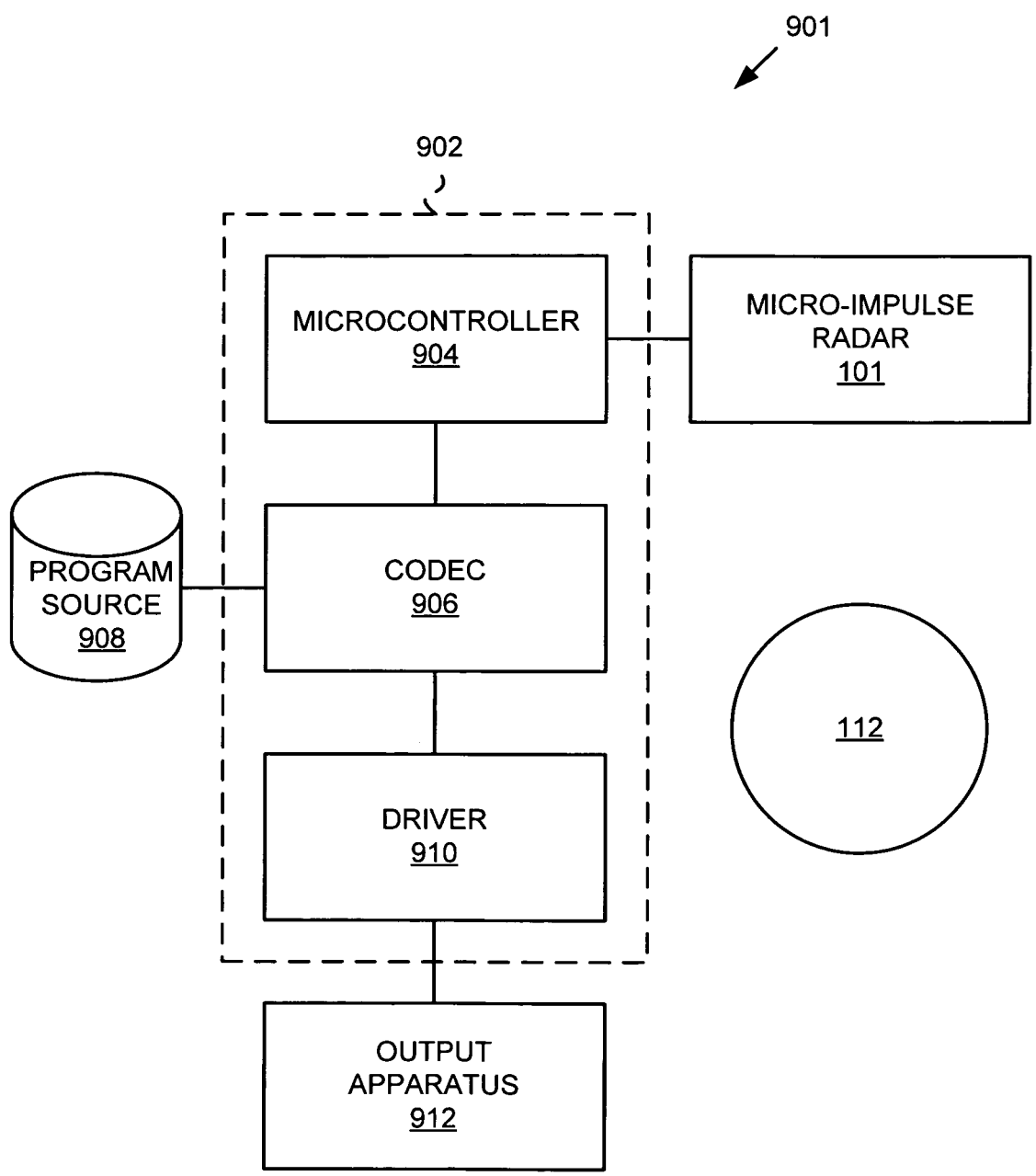
FIG. 9 is a block diagram of an entertainment system configured to adapt to personal preferences, according to an embodiment.

FIG. 9 is a block diagram of an entertainment system 901 configured to adapt to personal preferences, according to an embodiment. The entertainment system 901 includes a MIR 101 configured to probe a region proximate a media output apparatus and output a MIR signal. The MIR signal can include or consist essentially of MIR data. The MIR signal can include a MIR image. A controller 902 is configured to receive the micro-impulse radar signal from the MIR 101 and select one or more program options responsive to at least one of a presence, movement or a physiological parameter corresponding to one or more persons 112 in the probed region. For example, the controller 902 can be configured as an audio and/or video receiver. The MIR 101 can be separate from and operatively coupled to the controller 902 as shown, or optionally the MIR 101 and the controller 802 can be integrated.

The controller 902 is configured to drive a media output apparatus 912. The media output apparatus 912 is configured to present media content according to the one or more program options. For example, the media output apparatus 912 can include a television, a video monitor, one or more loudspeakers, a portable audio device, a lighting system, and/or a window treatment actuator. According to an embodiment, the media output apparatus 912 can include a portable media player carried by the person 112. One or more of the MIR 101 and the controller 902 can be thus be located remotely from and operatively coupled to the media output apparatus 912.

The entertainment system 901 can include at least one program source 908. Selecting at least one program option can include selecting programming from a plurality of available programming from the at least one program source 908. For example, the program source 908 can include an apparatus for receiving one or more streamed video and/or audio channels, a tuner for receiving one or more television channels, local solid state or rotating drive media track storage, an audio or video server, and/or a single- or multi-disc CD, DVD, or Blue Ray player. One or more program sources 908 can optionally be integrated into the controller 902, or can be operatively coupled to the controller 902 as shown. The at least one program source 908 can optionally be integrated into the output apparatus 912.

The controller 902 can include a microcontroller 904. The entertainment system 901 can include at least one codec 906. The codec 906 can optionally be integrated into the controller 902 as shown. The codec 906 can be operatively coupled to the microcontroller 904. Optionally, the codec 906 can be separate from and operatively coupled to the controller 902.

According to an embodiment, the codec 906 can be integrated into the at least one program source 908. According to an embodiment, the codec 906 can be integrated into the media output apparatus 912. Selecting at least one program option can include selecting a codec 906 or selecting a codec operating parameter.

The entertainment system 901 and the controller 902 can include one or more media output apparatus drivers 910. The one or more media output apparatus drivers 910 can be operatively coupled to the microcontroller 904 and to the at least one program source 908. Selecting at least one program option can include selecting a media output apparatus driver 910 or a media output apparatus driver operating parameter. For example, the one or more media output apparatus driver 910 can include one or more signal amplifiers; and selecting a media output apparatus driver parameter can include selecting an amount of amplification. Optionally, selecting a media output apparatus driver 910 operating parameter can include selecting between two or more media output apparatuses 912, which can include selecting both or more of the media output apparatuses 912.

The entertainment system 901 can be operated in a one or more of a variety of ways, according to embodiments.

For example, selecting one or more program options can be performed responsive to presence of one or more persons 112. This can include one or more of starting output of media responsive to arrival of one or more persons in the probed region and/or stopping or suspending output of media responsive to departure of one or more persons from the probed region.

Additionally or alternatively, selecting one or more program options can be performed responsive to movement, posture, and/or physiological parameter of one or more persons 112. This can include selecting a program option set responsive to detected movement, posture, or physiological parameter corresponding to attentiveness to a media output apparatus 912. For example, detected movement or posture corresponding to a media output apparatus 912 can include one or more of the one or more persons 112 approaching a video display, moving to an optimum listening area in an audio sound field, or remaining still in a viewing area of a video display. Additionally or alternatively, the detected movement or posture of the one or more persons 112 can include a rhythmic movement of the one or more persons in time with a rhythmic component of a media program. For example, rhythmic movement can include one or more of dancing, head bobbing, or toe tapping.

Additionally or alternatively, selecting one or more program options can be performed responsive to detecting a physiological parameter corresponding to one or more persons 112. Such a physiological parameter can include a physiological parameter corresponding to a response to media content. Sensing of physiological parameters and changes in physiological parameters is described above.

Selecting one or more program options responsive to detected movement or a physiological parameter may, for example, include one or more of increasing audio volume and enabling a video output apparatus responsive to receiving a MIR 101 signal corresponding to attentiveness. Additionally or alternatively, selecting one or more program options responsive to a detected movement, posture, or physiological parameter of one or more persons 112 corresponding to attentiveness to a media output apparatus 912 can include selecting and/or queuing additional program content having at least one characteristic similar to program content played during the detection of movement, posture, or physiological parameter corresponding to attentiveness.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer with micro-impulse radar feedback, comprising:
a display configured to display images to a person located in a first region; and
a micro-impulse radar configured to probe a second region to detect all or a portion of one or more individuals and produce a micro-impulse radar signal;
a processing unit operatively coupled to the micro-impulse radar to receive the micro-impulse radar signal and operatively coupled to the display for controlling the display, the processing unit including processing hardware and an operating system configured to run one or more application programs, the processing unit configured to determine a predicted emotional state of the one or more individuals at least partially from the micro-impulse radar signal; and
wherein at least one of the processing hardware, operating system, or application program is configured to read at least a subset of information associated with the micro-impulse radar signal and to conditionally select content or characteristics of the images displayed on the display responsive to the predicted emotional state, wherein the selected content or characteristics of the images responsive to the predicted emotional state are predicted to produce a target emotional state.

2. The computer with micro-impulse radar feedback of claim 1, wherein the second region is a portion of the first region.

3. The computer with micro-impulse radar feedback of claim 1, wherein the first region and second region are substantially coincident.

4. The computer with micro-impulse radar feedback of claim 1, wherein the first region is a portion of the second region.

5. The computer with micro-impulse radar feedback of claim 1, further comprising:
a signal processor configured to receive signals or data from the micro-impulse radar and to perform signal processing on the signals or data to extract one or more signals corresponding to at least one of human presence, human movement, or human physiological processes.

6. The computer with micro-impulse radar feedback of claim 5, wherein the signal processor is configured as a portion of the processing hardware.

7. The computer with micro-impulse radar feedback of claim 5, wherein the signal processor is embodied as software operable to run on the processing unit.

8. The computer with micro-impulse radar feedback of claim 5, wherein the signal processor includes dedicated hardware and computer executable instructions operable to run on the processing hardware.

9. The computer with micro-impulse radar feedback of claim 5, wherein the signal processor includes Fourier transformation hardware or software.

10. The computer with micro-impulse radar feedback of claim 5, further comprising:
a signal analyzer configured to receive signals or data from the signal processor and to perform signal analysis to determine, from the one or more extracted signals, variable data corresponding to at least one of the human presence, the human movement, or the human physiological processes, the content or characteristics of the images displayed on the display being controlled responsive to the variable data.

11. The computer with micro-impulse radar feedback of claim 10, further comprising:
an interface operatively coupled to the signal analyzer and configured to output micro-impulse radar data including the variable data corresponding to at least one of the human presence, the human movement, or the human physiological processes to the processing unit.

12. The computer with micro-impulse radar feedback of claim 5, wherein the signal processor is integrated into the processing unit.

13. The computer with micro-impulse radar feedback of claim 5, wherein the signal processor is integrated into the micro-impulse radar.

14. The computer with micro-impulse radar feedback of claim 5, wherein the signal processor is configured to output micro-impulse radar data corresponding to the at least one of human presence, human movement, or human physiological processes to one or more memory circuit or storage device locations.

15. The computer with micro-impulse radar feedback of claim 14, wherein the operating system is configured to read at least a subset of the micro-impulse radar data at the one or more memory circuit or storage device locations and responsively adjust one or more operating system parameters.

16. The computer with micro-impulse radar feedback of claim 15, wherein responsive adjustment of one or more operating system parameters includes waking the operating system from a sleep mode responsive to micro-impulse radar data corresponding to human presence in the second region.

17. The computer with micro-impulse radar feedback of claim 15, wherein adjustment of one or more operating system parameters includes selection of terse prompts or fast response responsive to micro-impulse radar data corresponding to human movement or physiological processes characteristic of impatience or urgency.

18. The computer with micro-impulse radar feedback of claim 15, wherein adjustment of one or more operating system parameters includes entering a sleep mode responsive to micro-impulse radar data corresponding to departure of an individual from the second region.

19. The computer with micro-impulse radar feedback of claim 15, wherein adjustment of one or more operating system parameters includes conversion of the micro-impulse radar data into cursor movements.

20. The computer with micro-impulse radar feedback of claim 15, wherein adjustment of one or more operating system parameters includes conversion of the micro-impulse radar data into computer pointer device commands.

21. The computer with micro-impulse radar feedback of claim 14, wherein an application program is configured to read at least a subset of the micro-impulse radar data at the one or more memory circuit or storage device locations and responsively adjust application program parameters.

22. The computer with micro-impulse radar feedback of claim 21, wherein the application program is configured to convert the micro-impulse radar data to program commands.

23. The computer with micro-impulse radar feedback of claim 21, wherein the application program is configured to convert the micro-impulse radar data to one or more preferences selections.

24. The computer with micro-impulse radar feedback of claim 23, wherein the one or more preferences selections includes at least one of automated help, terse response, verbose response, or magnification.

25. The computer with micro-impulse radar feedback of claim 1, wherein the information associated with the micro-impulse radar signal corresponds to a human physiological process.

26. The computer with micro-impulse radar feedback of claim 25, wherein the physiological process includes at least one of heartbeat, perspiration or breathing.

27. The computer with micro-impulse radar feedback of claim 25, wherein the processing unit is configured to correlate the physiological process to the predicted emotional state of an individual.

28. The computer with micro-impulse radar feedback of claim 27, wherein the operating system or application program is configured to conditionally select a program execution path as a function of the predicted emotional state.

29. A method for controlling a computer, comprising:
receiving one or more micro-impulse radar signals from one or more regions;
performing analysis on the one or more micro-impulse radar signals to determine an emotional state of one or more persons in the one or more regions; and
conditionally selecting an operation parameter of the computer predicted to produce a target emotional state of the one or more persons in the one or more regions responsive to the emotional state.

30. The method for controlling a computer of claim 29, wherein performing the analysis on the micro-impulse radar signals includes determining at least one physiological parameter corresponding to the one or more persons.

31. The method for controlling a computer of claim 30, wherein the at least one physiological parameter includes at least one of heart rate, perspiration, or breathing rate.

32. The method for controlling a computer of claim 30, wherein the at least one physiological parameter determines the physiological state of the person.

33. The method for controlling a computer of claim 30, further comprising:
correlating the at least one physiological parameter to the predicted emotional state.

34. The method for controlling a computer of claim 33, wherein correlating the at least one physiological parameter to the predicted emotional state includes:
correlating the physiological parameter to an autonomic nervous system state; and
correlating the autonomic nervous system state to the predicted emotional state.

35. The method for controlling a computer of claim 29, wherein selecting an operation parameter includes conditionally selecting computer program logic.

36. The method for controlling a computer of claim 29, wherein selecting an operation parameter includes waking portions of the computer when the one or more persons enters the one or more regions.

37. The method for controlling a computer of claim 36, wherein the computer is located in one of the regions.

38. The method for controlling a computer of claim 36, further comprising, prior to waking the portions of the computer, performing analysis on a sequence of micro-impulse radar signals to determine a probability that the one or more persons has an intent to use the computer.

39. The method for controlling a computer of claim 38, wherein determining the probability that the one or more persons has an intent to use the computer includes analyzing movements of the one or more persons.

40. The method for controlling a computer of claim 39, wherein the one or more persons is determined to have a high probability of intent to use the computer when the one or more persons enter a computer operating position or approach a chair near the computer.

41. The method for controlling a computer of claim 39, wherein the one or more persons is determined to have a high probability of intent to use the computer when the one or more persons near or reach for a computer keyboard or a computer pointing device or near a computer display.

42. The method for controlling a computer of claim 29, wherein selecting an operation parameter includes putting portions of the computer in a sleep mode when the one or more persons leaves the one or more regions.

43. The method for controlling a computer of claim 29, further comprising:
analyzing movements of the one or more persons; and
wherein selecting an operating parameter includes entering one or more software commands responsive to the movements.

44. The method for controlling a computer of claim 43, wherein the one or more software commands includes commands to operate game software on the computer.

45. The method for controlling a computer of claim 44, wherein the one or more software commands are selected to drive virtual movements of one or more game entities corresponding to the movements of the one or more persons.

46. An entertainment system configured to adapt to personal preferences, comprising:
a media output apparatus configured to present media content according to one or more program options;
a micro-impulse radar configured to probe a region proximate the media output apparatus that includes one or more persons therein and output a micro-impulse radar signal; and
a controller configured to receive the micro-impulse radar signal, determine an emotional state of the one or more persons at least partially based on the micro-impulse radar signal, and select the one or more program options responsive to the determined emotional state corresponding to the one or more persons in the probed region, wherein the one or more program options are predicted to produce a target emotional state in the one or more persons.

47. The entertainment system of claim 46, further comprising:
at least one program source;
wherein selecting one or more program options includes selecting programming from the program source.

48. The entertainment system of claim 46, further comprising:
at least one codec;
wherein selecting one or more program options includes selecting a codec or selecting a codec operating parameter.

49. The entertainment system of claim 46, further comprising:
one or more media output apparatus drivers; and
wherein selecting one or more program options includes selecting a media output apparatus driver or a media output apparatus driver parameter.

50. The entertainment system of claim 49, wherein the one or more media output apparatus drivers include one or more signal amplifiers; and
    wherein selecting a media output apparatus driver parameter includes selecting an amount of amplification.

51. The entertainment system of claim 49, wherein selecting a media output apparatus driver parameter includes selecting between two or more media output apparatuses.

52. The entertainment system of claim 46, wherein selecting one or more program options responsive to presence includes one or more of starting output of media responsive to arrival of one or more persons in the probed region and stopping or suspending output of media responsive to departure of one or more persons from the probed region.

53. The entertainment system of claim 46, wherein selecting one or more program options responsive to movement or a physiological parameter includes selecting one or more program options responsive to detected movement or physiological parameter corresponding to attentiveness to a media output apparatus.

54. The entertainment system of claim 53, wherein selecting one or more program options responsive to detected movement or a physiological parameter corresponding to attentiveness to a media output apparatus includes one or more of increasing audio volume and enabling a video output apparatus.

55. The entertainment system of claim 53, wherein the detected movement corresponding to attentiveness to a media output device includes one or more of the one or more persons approaching a video display, moving to an optimum listening area in an audio sound field, changing orientation relative to a video display, or remaining still in a viewing area of a video display.

56. The entertainment system of claim 53, wherein the movement includes a rhythmic movement of the one or more persons in time with a rhythmic component of a media program.

57. The entertainment system of claim 56, wherein the rhythmic movement includes one or more of dancing, head bobbing, or toe tapping.

58. The entertainment system of claim 53, wherein selecting one or more program options responsive to detected movement or physiological parameter corresponding to attentiveness to a media output apparatus includes selecting additional program content having at least one characteristic similar to program content played during detection of movement corresponding to attentiveness.

59. The entertainment system of claim 46, wherein the micro-impulse radar and the controller are integrated.

60. The entertainment system of claim 46, wherein the media output apparatus includes a portable media player carried by the person.

61. The entertainment system of claim 60, wherein one or more of the micro-impulse radar and the controller are located remotely from the portable media player.

62. The entertainment system of claim 46, wherein the physiological parameter includes a physiological parameter corresponding to a response to the media content.

\* \* \* \* \*